United States Patent [19]
Marumo et al.

[11] 3,710,651
[45] Jan. 16, 1973

[54] LINE PRESSURE REGULATING SYSTEM FOR AUTOMATIC POWER TRANSMISSION

[75] Inventors: Nagayuki Marumo; Namio Irie, both of Yokohama, Japan

[73] Assignee: Nissan Motor Company, Limited, Yokohama, Japan

[22] Filed: March 8, 1971

[21] Appl. No.: 121,776

[30] Foreign Application Priority Data

March 18, 1970 Japan..............................45/22483

[52] U.S. Cl......................................74/864, 74/866
[51] Int. Cl. .............................................B60k 21/00
[58] Field of Search..............................74/864,866

[56] References Cited

UNITED STATES PATENTS

| | | | |
|---|---|---|---|
| 3,267,762 | 8/1966 | Reval............................74/866 X |
| 3,433,101 | 3/1969 | Scholl et al............................74/866 |
| 3,495,481 | 2/1970 | Ohie et al..............................74/864 |
| 3,561,296 | 2/1971 | Iijima....................................74/869 |
| 3,583,259 | 6/1971 | Shimosaki..............................74/864 |

*Primary Examiner*—Arthur T. McKeon
*Attorney*—John Lezdey

[57] ABSTRACT

A system for regulating a line pressure in a hydraulic control circuit for an automatic power transmission that is capable of reducing the line pressure to a sufficiently low level to prevent shift shock at the time of gear shifting. When gear shifting is to be effected, a gear shift command signal is supplied to an electronic line pressure control circuit including a monostable multivibrator to keep the multivibrator in a metastable state for a predetermined period of time. During the time period the electronic line pressure control circuit generates a line pressure reduction signal which is supplied to a pressure regulating valve arrangement, thereby reducing the line pressure to the sufficiently low level. The line pressure is normally maintained at a sufficiently high level to prevent slippage of the friction-drive-establishing devices of the automatic power transmission.

5 Claims, 4 Drawing Figures

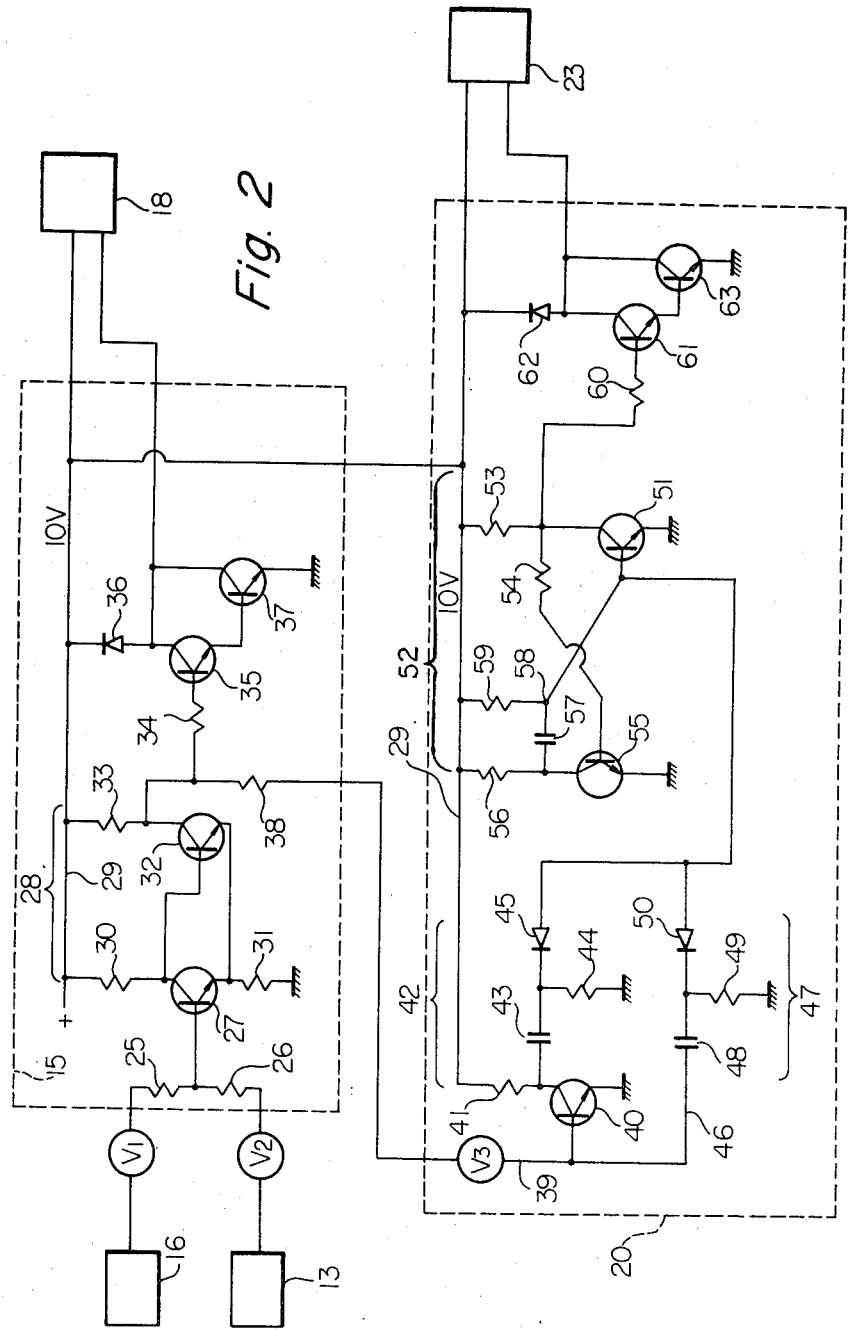

LINE PRESSURE REGULATING SYSTEM FOR AUTOMATIC POWER TRANSMISSION

This invention relates to an automatic power transmission and more particularly to a system for regulating line pressure in a hydraulic control circuit, which pressure is transmitted to the friction-drive-establishing devices of the transmission.

An automatic power transmission is now widely used in various motor vehicles to reduce driver effort in vehicle operation. A typical one consists of a torque converter, a gear train and a plurality of friction-drive-establishing devices such as friction clutches and brakes which, when actuated, serve to control the relative motions of the individual working elements of the gear train in such a manner as to establish forward and reverse drive power flows from the prime mover to the driven member of the transmission. Actuation of the friction clutches and brakes is effected by energizing a series of solenoid valves through which fluid pressure, called "line pressure", is transmitted to the friction clutches and brakes. It is, in this instance, important to have the line pressure regulated properly in accordance with the varying driving conditions of the motor vehicle, because an excessive line pressure results in unusual mechanical shocks experience during gear shifting and, on the contrary, an insufficient line pressure invites a slippage of brake bands which, in turn, leads to inability of starting the vehicle or attaining a desired gear ratio and, furthermore, which tends to cause premature wear of the brake bands.

In a conventional automatic transmission, however, the line pressure is kept at a sufficiently high level to prevent slippage of the brake bands while the problem of shift shock is left unsolved. It has been also tried to maintain line pressure at such a sufficiently high level at vehicle speeds below a predetermined speed but at a level low enough to prevent shift shock above the predetermined speed. However, these schemes are not satisfactory.

It is therefore an object of this invention to provide an improved line pressure regulating system for an automatic power transmission with a view to overcoming the above-said disadvantages.

It is another object of this invention to provide a line pressure regulating system that is capable of reducing line pressure to a sufficiently low level to prevent mechanical shock at the time of gear shifting while at other times maintaining the pressure at a level high enough to prevent slippage of the brake bands.

A better understanding of the invention may be had by referring to the following description and drawings, in which:

FIG. 2 is an illustration of an electronic gear shift control circuit and an electronic line pressure control circuit shown in FIG. 1;

It is intended that the line pressure regulating system of the invention be applicable to a large variety of automatic transmissions, particularly those in which shifting can be carried out by the operation of brakes or clutches. However, the specific embodiment herein is designed to apply to a transmission of the type which is described in detail in the U.S. Pat. No. 3,640,156 of Yoichi Mori et al entitled "Control system for automotive automatic transmission" and, therefore the detail description of the same is herein omitted for the sake of simplicity of illustration.

Figure 1:
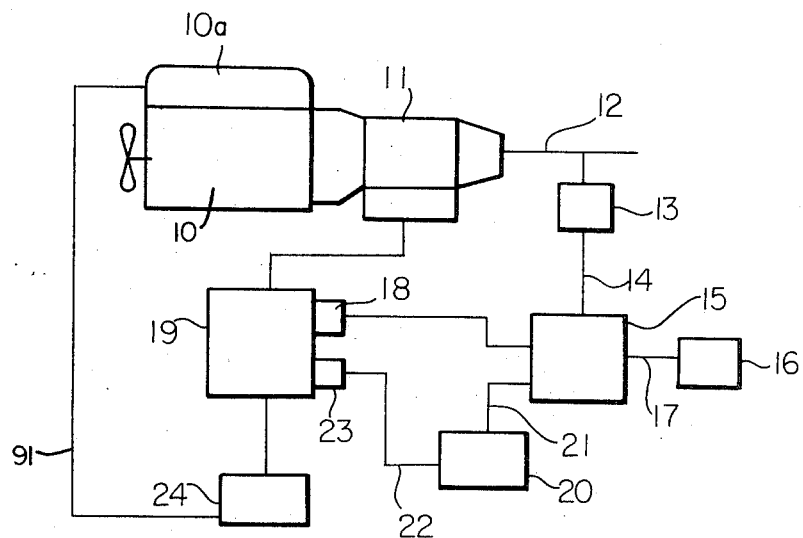
FIG. 1 is a block diagram showing an automotive vehicle driveline and a line pressure regulating system according to this invention.

Referring to FIG. 1, a preferred embodiment of this invention is shown in block form. In the figure, a vehicle engine 10 provided with an intake manifold 10a is connected operatively to an automatic transmission 11, the power output portion of which is connected to an output shaft 12. A vehicle speed sensor 13 is provided for sensing revolutions of the output shaft 12 to generate an electric signal corresponding to vehicle speed. The vehicle speed sensor 13 may be of the type which is disclosed in the U.S. Pat. No. 3,433,101 entitled "Electronic arrangement for shifting gears in motor vehicles" or in the U.S. Pat. No. 3,448,640 entitled "Electrical control for automatic transmission". The electric signal thus generated is supplied through a line 14 to an electric gear shift control circuit 15. Another sensor 16 is provided for sensing throttle opening to generate an electric signal corresponding thereto, which signal is supplied through a line 17 to the electronic gear shift control circuit 15. The sensor 16 may be of the type which is disclosed in the U.S. Pat. No. 3,470,854 entitled "Fuel injection system for internal combustion engines" or in the U.S. Pat. No. 3,448,640 as already mentioned.

The electronic gear shift control circuit 15 functions to determine proper reduction gear ratios under different driving conditions of the vehicle in response to the electric signals from the vehicle speed sensor 13 and the throttle opening sensor 16 and, upon detection of an improper reduction gear ratio, to supply a gear shift command signal to a first electronic actuator 18. In response to the gear shift command signal, the first electronic actuator 18 operates a hydraulic control device 19 in such a manner as to effect a transition to a proper reduction gear ratio. The hydraulic control device 19 may be of the type which is disclosed in the U.S. Pat. No. 3,640,156 as already mentioned.

The gear shift command signal is also supplied to an electronic line pressure control circuit 20 through a line 21. The electronic line pressure control circuit 20 is connected through a line 22 to a second electronic actuator 23 such as a solenoid valve (see FIG. 3). The function of the electronic line pressure control circuit 20 is to keep the second electronic actuator 23 energized for a predetermined length of time. The second electronic actuator 23, when energized, serves to cooperate with the hydraulic control device 19 and an intake manifold vacuum sensor 24 to reduce line pressure to a predetermined level sufficiently low for preventing shift shock (which level will be hereinafter referred to as "dynamic" level). The intake manifold vacuum sensor 24 may be of the type which is disclosed in the U.S. Pat. No. 3,495,481 entitled "Automatic speed change gear control device for use in automobiles". During the time when the second electronic actuator 23 is kept de-energized the line pressure remains at another predetermined level sufficiently high for preventing slippage of the brake bands of the friction devices (not shown). The higher predetermined pressure level will be hereinafter to as "static" level.

The predetermined length of time during which the second electronic actuator 23 is kept energized depends upon the time necessary to effect a gear shift smoothly, viz., without causing any mechanical shock. In the ordinary automatic transmission mounted on a motor vehicle, the time required is shorter than a few seconds. In the present system, the predetermined length of time is set slightly longer than the length of time required to effect a gear shift. By so doing, mechanical shocks experienced in effecting a gear shift can be eliminated together with slippage of the friction devices.

Considering the fact that the present invention contemplates to reduce line pressure to the "dynamic" level at the time of gear shifting while at other times maintaining it at the "static" level, it is to be understood that the invention could equally well be applied to any type of electronically controlled automatic transmission adapted to be responsive to an electric command signal to effect a gear shift. This invention will be described hereinafter in greater detail in connection with a line pressure regulating system to be mounted on an automatic transmission of the type in which a transition between two speeds of forward drive is possible in response to electric signals from a throttle opening sensor and a vehicle speed sensor.

In FIG. 2, there is shown an example of the electronic gear shift control circuit 15 and the electronic line pressure control circuit 20 according to this invention.

The electronic gear shift control circuit 15 is adapted to receive two electric signals $V_1$ and $V_2$ from the throttle opening sensor 16 and the vehicle speed sensor 13, respectively. The electric signal $V_1$ is a positive voltage the magnitude of which increases in proportion to an increase in throttle opening. The vehicle speed signal $V_2$ is a negative voltage the magnitude of which increases as the vehicle speed rises. The electric signals $V_1$ and $V_2$ are supplied through resistors 25 and 26 having resistances $R_1$ and $R_2$, respectively, to the base of a transistor 27 which forms part of a Schmidt Trigger 28. The transistor 27 is connected at its collector to a bus line 29 of +10 volts through a resistor 30 and at its emitter to ground through a resistor 31. The collector of the transistor 27 is also connected directly to the base of a transistor 32 the emitter of which is connected to the emitter of the transistor 27. The collector of the transistor 32 is connected through a resistor 33 to the bus line 29. In the operation of the Schmidt Trigger 28, an input voltages, viz., a voltage appearing at the base of the transistor 27 changes as follows:

When $V_2 > (V_1/R_1)xR_2$, the input voltage is negative;

and when $V_2 < (V_1/R_1)R_2$, it is positive.

When the input voltage becomes positive, the transistor 27 is rendered conductive to render the transistor 32 nonconductive, so that the voltage appearing at the collector of the transistor 32 increases to approximately +10 volts. However, while the input voltage remains negative because the vehicle speed is so high that the expression $V_2 > (V_1/R_1)xR_2$ holds, an output voltage, viz., the voltage at the collector of the transistor 32 is equal to approximately zero volts.

The output voltage is applied through a resistor 34 to the base of a transistor 35. The transistor 35 is connected at its collector to the bus line 29 through a diode 36 and at its emitter to the base of a transistor 37 the emitter of which is grounded. The collectors of the transistors are connected together to the first electronic actuator 18 to which the bus line 29 also is connected. When the output voltage of the Schmidt Trigger 28 increases to approximately +10 volts, the transistor 35 is rendered conductive to render the transistor 37 also conductive, so that the first electronic actuator 18 is energized. Upon being energized, the first electronic actuator 18 operates the hydraulic control device 19 in such a manner that downshift to first forward speed is effected in the automatic transmission 11. If, on the other hand, the output voltage of the Schmidt Trigger 28 drops to approximately zero volts, the transistor 35 is rendered nonconductive, whereupon the transistor 37 also is rendered nonconductive. When this occurs, the first electronic actuator 18 is deenergized, so that upshift to second forward speed is effected in the automatic transmission 11. Thus, it is to be noted in this embodiment that a first forward speed is established while the output of the Schmidt Trigger 28 remains at approximately +10 volts and a second forward speed is established while the output remains at approximately zero volts. Furthermore, it is to be understood that the output of the Schmidt Trigger 28 is the gear shift command signal as described above in conjunction with FIG. 1.

The gear shift command signal (which will be referred to as a signal $V_3$) is also supplied through a resistor 38 and a line 39 to the electronic line pressure control circuit 20, more specifically, to the base of a transistor 40 serving as an invertor. The transistor 40 has its collector connected to the bus line 29 through a resistor 41 and its emitter grounded. During the first forward speed, viz., when the signal voltage $V_3$ is equal to approximately 10 volts, the transistor 40 is kept conductive so that the collector voltage is approximately zero volts. During the second forward speed, the collector voltage is kept at a level of approximately 10 volts.

Connected to the collector of the transistor 40 is a differentiator 42 consisting of a capacitor 43 and a grounded resistor 44, the junction between which is connected to a diode 45. The diode 45 is so polarized as to allow only a negative pulse to pass therethrough. The negative pulse is generated by the differentiator 42 only when the signal voltage $V_3$ is changed from zero to +10 volts due to downshift from the second to first forward speed.

The signal $V_3$ is also applied through a line 46 to another differentiator 47 comprising a capacitor 48 and a grounded resistor 49, the junction between which is connected to a diode 50. Like the diode 45, the diode 50 is so polarized as to allow only a negative pulse to pass therethrough. Since, unlike the differentiator 42, there is no invertor 40 connected to the input of the differentiator 47, the negative pulse is produced only when the signal voltage $V_3$ is changed from +10 volts to zero due to upshift from the first to second forward speed. Therefore, it is to be understood that whether a gear shift effected is a downshift or an upshift a negative pulse is allowed to pass through either the diode 45 or 50 to the following circuit.

The diodes 45 and 50 are connected together to the base of a normally conducting transistor 51 which forms part of a monostable multivibrator 52. The transistor 51 has its collector connected through a resistor 53 to the bus line 29 and its emitter grounded. The collector of the transistor 51 is also connected through a resistor 54 to the base of a normally nonconducting transistor 55, the emitter thereof being grounded. The collector of the normally nonconducting transistor 55 is connected to the bus line 29 through a resistor 56 and to the base of the normally conducting transistor 51 through a capacitor 57. The junction 58 between the capacitor 57 and the base of the normally conducting transistor 51 is connected through a resistor 59 to the bus line 29. During gear shifting a negative pulse passed through the diode 45 or 50 is supplied to the normally conducting transistor 51 to render it nonconductive, triggering the monostable multivibrator 52 to its metastable state. The monostable multivibrator 52 is kept in the metastable state for a fixed length of time dependent upon the capacitor 57 and the resistor 59. During the fixed length of time the collector of the normally conducting transistor 51 remains at approximately 10 volts. The collector is connected through a resistor 60 to the base of a transistor 61. The transistor 61 is connected at its collector to the bus line 29 through a diode 62 and at its emitter to the base of a transistor 63, the emitter thereof being grounded. The collectors of the transistors 61 and 63 are connected together to the second electronic actuator 23 which is connected also to the bus line 29.

When the collector voltage of the transistor 51 increase to approximately 10 volts, the transistor 61 is rendered conductive and simultaneously the transistor 63 is rendered conductive. Thus, a current path is established from the bus line 29 to ground through the second electronic actuator 23 and the transistor 63. When this occurs, the second electronic actuator 23 acts on the hydraulic control device 19 so that the line pressure in the hydraulic control circuit is reduced to the "dynamic" level. Upon termination of the fixed time period, the monostable multivibrator 52 resumes its original stable state to de-energize the second electronic actuator 23, so that the line pressure rises to the "static" level.

Figure 3:
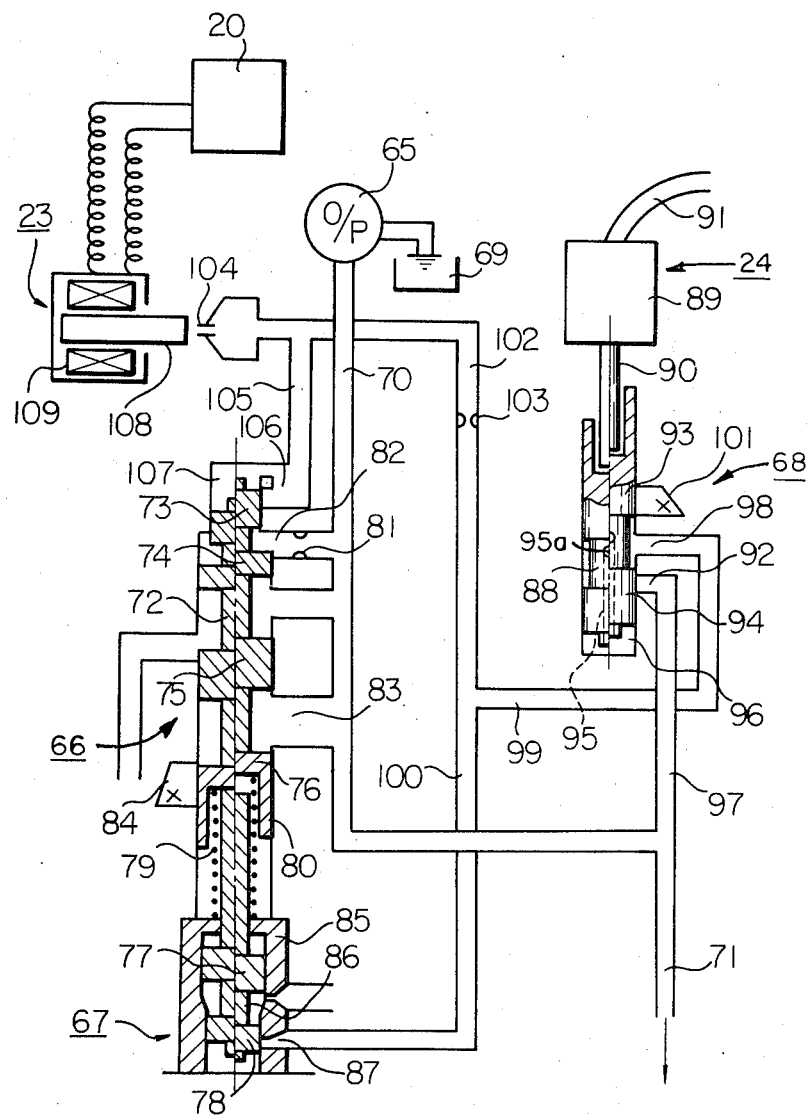
FIG. 3 is a schematic view of a portion of the hydraulic control device shown in FIG. 1, which serves to vary line pressure transmitted to the transmission.

In FIG. 3 there is shown diagrammatically that portion of the hydraulic control device 19 which serves to vary line pressure between the "static" and "dynamic" levels. The portion of the hydraulic control device 19 as shown comprises, essentially, an engine driven fluid pump 65, a regulator valve 66, an amplifier valve 67 and a vacuum valve 68. The engine driven fluid pump 65 functions to deliver fluid under pressure from a sump 69 through a first main line 70 into a line 71 leading to a number of friction devices (not shown) through a manual valve (not shown).

As shown, the regulator valve 66 and the amplifier valve 67 are formed integrally with each other and include a unitary valve spool 72 which is axially slidable and has spaced lands 73, 74, 75, 76, 77 and 78 provided thereon. A coil spring 79 is mounted in a spring pocket 80 at the lower end of the regulator valve 66 to bias the valve spool 72 upward in the drawing. The pressure in the line 70 (which is the "line pressure" described above) is transmitted through an orifice 81 to a port 82 to bias the spool 72 downward in the drawing due to the difference between the facing areas of the lands 73 and 74 subject to pressure. The line pressure also enters the space between the lands 75 and 76 through a port 83. The port 83 is not in communication with an exhaust port 84 when the spool 72 is in the position as indicated by the right half portion of the spool 72. However, as the spool 72 is moved downward, the port 83 is brought into communication with the exhaust port 84, permitting the line 70 to be exhausted, so that the line pressure is reduced. The reduction in the line pressure causes a decrease in the pressure transmitted through the port 82 to the space between the lands 73 and 74 having different facing areas subject to pressure, so that the force tending to move the spool 72 downward against the bias of the coil spring 79 is diminished. This will again move the spool 72 upward. Thus, the pressure in the line 70 is automatically maintained at a certain level PL which is determined by the biasing force F of the coil spring 79 and the difference in facing areas S subject to pressure between the lands 73 and 74 according to the following expression:

$$PL = F/S$$

The amplifier valve 67 includes a valve housing 85 in which an axially slidable spool 86 viz., an extension of the regulator valve spool 72 is mounted. The amplifier valve spool 86 has lands 77 and 78 provided thereon. A port 87 formed near the lower end of the valve housing 85 is open to the space between the lower land 78 and the bottom of the valve 67. Thus, the spool 86 is biased upward by a pressure exerted on the end of the spool 86 through the port 87. This pressure is in the same direction as that exerted on the spool 72 by the coil spring 79 to increase line pressure.

The vacuum valve 68 includes an axially slidable spool 88 which is operatively connected to the intake manifold vacuum sensor 24 comprising a vacuum modulator diaphragm 89 by means of a plunger 90. The vacuum modulator diaphragm 89 is biased in a direction to move the spool 88 downward by a spring (not shown) and simultaneously in a direction to move the spool 88 upward by a vacuum transmitted through a line 91 from an intake manifold of the prime mover. Thus, as the vacuum in the intake manifold grows higher and higher, the force tending to move the spool 88 downward through the plunger 90 is decreased. Therefore, it will be appreciated that the raised position as indicated by the right half of the spool 88 corresponds to a high intake manifold vacuum and the lowered position as indicated by the left half corresponds to a low intake manifold vacuum.

The port 92 is provided in the vacuum valve 68 at a position to provide communication to the space between lands 93 and 94 when the spool 88 is in the lowered position as shown by the left half of the spool 88. The spool 88 has formed therein an axially extending passage 95 which connects the space between the lands 93 and 94 to an end chamber 96 through a radial bore 95a. Thus, in the lowered position, the pressure in the line 70 transmitted through a line 97 to the port 92 enters the end chamber 96 through the bore 95a and the passage 95 and exerts a force on the end of the spool 88, tending to force it upward in the drawing. As shown, the vacuum valve 68 has another port 98 opening to the space between the lands 93 and 94, the port 98 being coupled through a line 99 to a second main line 100 leading to the port 87 of the amplifier valve 67. The valve 68 also includes an exhaust port 101 which is blocked by the land 93 when the spool 88 is in the lowered position. In the raised position, the exhaust port 101 is opened and brought into communication with the port 98 through the space between the lands 93 and 94 to permit the line 100 to be exhausted. As a result, the pressure in the line 100 leading to the amplifier valve 67 decreases and the force tending to move the amplifier valve spool 86 upward is reduced. Thus, it will be appreciated that the pressure in the line 70 is regulated to a level as determined by the downward force exerted on the vacuum valve spool 88 by the vacuum modulator diaphragm 89. The pressure in the line 100 is at higher levels for lower intake manifold vacuums, viz., at near full throttle and is at lower levels for higher intake manifold vacuums, viz., at zero to light throttle.

As described above, the pressure in the line 100 is transmitted to the amplifier valve 67 and exerts a force on the end of the spool 86 to tend to move it upward in the drawing. The force thus exerted tends to close the port 83 from exhaust to increase the pressure in the line 70. Thus, it will be understood that the pressure in the line 70 increases with the increases of the pressure in the line 100.

A third main line 102 leading from the second main line 100 has an orifice 103 therein and is connected to a nozzle 104. Pressure in the line 102 is also transmitted through a branch line 105 to a port 106 provided at the top of the regulator valve 66, and enters an end chamber 107 to exert a force on the upper end of the regulator valve spool 72 tending to move it downward against the biases of the coil spring 79 and the amplifier valve 67.

The nozzle 104 is adapted to be opened and closed by the action of the second electronic actuator 23 which, in this embodiment, comprises a plunger 108 and a solenoid coil 109 for moving the plunger 108 to the nozzle closing position when energized. With the solenoid coil 109 deenergized, the oil debouching from the nozzle 104 strikes the end of the plunger 108, moving it to the left. At this time, the pressure in the line 102 is approximately at zero level. Thus, the pressure in the line 100 is transmitted only to the end chamber of the amplifier valve 67, tending to move the spool 86 upward. This means that the exhaust port 84 is blocked by the land 76 with the resultant increase in the pressure in the line 70. The increased pressure in the line 70 is the "static" pressure level described above.

When the second electronic actuator 23 is energized in response to the electric signal from the electronic line pressure control circuit 20, the plunger 108 is moved to the nozzle closing position. With the nozzle 104 closed, the pressure in the line 102 rises to a level which is approximately equal to that in the line 100. Thus, the regulator valve spool 72 is biased downward by a pressure transmitted through the branch line 105 to the end chamber 107. This spool movement will tend to open the exhaust port 84, as a result, reduce the pressure in the line 70. The lower pressure in the line 70 which is maintained in the entire system while the electronic second actuator 23 is energized is the "dynamic" line pressure described above.

Figure 4:
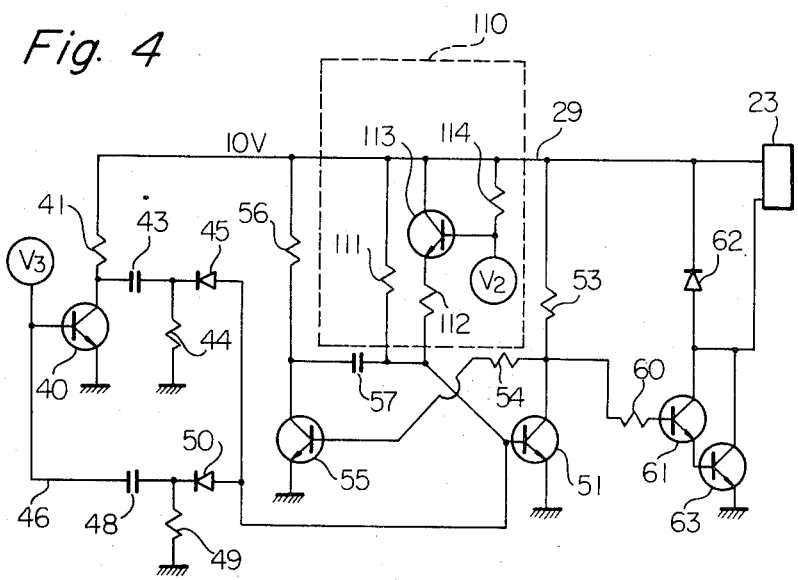
FIG. 4 is a circuit diagram showing another example of the electronic line pressure control circuit shown in FIG. 1.

FIG. 4 is a circuit diagram showing another example of the present electronic line pressure control circuit 20 which is different from that of FIG. 2 in that the time during which the line pressure is maintained at the "dynamic" level varies with vehicle speed. In the figure, like parts and components of the circuit are designated by the same reference numerals as used in FIG. 2. A portion of the circuit enclosed within a rectangle 110 of broken lines corresponds to the resistor 59 shown in FIG. 2. A resistor 111 is connected between the bus line 29 and the base of the normally conducting transistor 51. Another resistor 112 is also connected at one end to the base of the transistor 51 and at the other end to the emitter of a transistor 113. The transistor 113 is connected at its collector to the bus line 29 and at its base to a resistor 114 leading to the bus line 29. The output signal $V_2$ of the vehicle speed sensor 13 is applied to the base of the transistor 113 to modulate the conductivity of the collector-emitter path. Since, as described above, the signal $V_2$ is a negative voltage the magnitude of which increases as the vehicle speed rises, the conductivity of the collector-emitter path decreases with increasing vehicle speed. Thus, with the increase of vehicle speed, the equivalent resistance given by the resistors 111 and 112 and the transistor 113 increases with the resultant increase in the time T during which the line pressure is kept at the "dynamic" level. On the other hand, when the vehicle speed drops, the time T decreases. According to this invention, the time T is set slightly longer than the time required to effect a gear shift at different vehicle speeds, for the purpose of preventing the friction devices from being critically damaged. The reason is that upon termination of the time T the line pressure resumes its original "static" level preventing the slippage of the cooperating friction devices.

In this embodiment, it is to be understood that the time T can be related also to engine output torque. In this instance, the output torque signal to be applied to the base of the transistor 113 should be a negative voltage the magnitude of which increases as the output torque rises. With this arrangement, the time T during which the line pressure is kept at the "dynamic" level varies with vehicle speed and engine output torque, insuring a perfect and shock-free gear shift.

What is claimed is:

1. A system for regulating a line pressure in a hydraulic control circuit for an automatic power transmission, for a motor vehicle having an internal combustion engine provided with an intake manifold and a throttle valve, having a plurality of friction-drive-establishing devices, comprising: a first means for producing a first electric signal corresponding to vehicle speed, a second means for producing a second electric signal corresponding to a throttle opening, a first circuit means for determining proper reduction gear ratios under different driving conditions of the motor vehicle in response to said first and second electric signals to produce a gear shift command signal, said first circuit means consisting of a Schmidt Trigger circuit having a common input connected to said first and second means, a first electronic actuator responsive to said gear shift command signal for operating the hydraulic control circuit so as to effect a transition to a proper reduction gear ratio, a second circuit means for producing a line pressure reduction signal for a predetermined length of time in response to said gear shift command signal, said second circuit means consisting of means for producing a trigger pulse in response to said gear shift command signal and means for producing said line pressure reduction signal in response to said trigger pulse, a second electronic actuator responsive to said line pressure reduction signal, and a hydraulic control means for reducing said line pressure to a predetermined level sufficiently low by means of said second electronic actuator in order to prevent shift shock, said hydraulic control means including a means for sensing a vacuum in the intake manifold and said line pressure being normally maintained at a sufficiently high level in order to prevent slippage of the friction-drive-establishing devices.

2. A system according to claim 1, in which said means for producing a trigger pulse comprises a series combination of an invertor, a first differentiator and a first diode and a series combination of a second differentiator and a second diode, and said means for producing said line pressure reduction signal in response to said trigger pulse comprises a monostable multivibrator adapted to be kept in metastable state, said two series combinations being connected in parallel with the input of said monostable multivibrator and the length of time during which said monostable multivibrator is kept in its metastable state determining the duration of said line pressure reduction signal.

3. A system according to claim 2, in which said length of time increases as said vehicle speed rises and further increases in proportion to an increase in said throttle opening.

4. A system according to claim 1, in which said second electronic actuator comprises a solenoid coil connected to said second circuit means and a plunger.

5. A system according to claim 1, in which said hydraulic control means comprises a first main line leading from the outlet port of an engine driven fluid pump, a regulator valve connected to said first main line and having an axially slidable spool therein, said spool being slidable in one direction to increase the pressure in said first main line and in the opposite direction to reduce the pressure in said first main line tending to slide said spool in the opposite direction, a vacuum valve connected through a branch line to said first main line and having an axially slidable spool therein, said spool being operatively connected to the intake manifold vacuum sensor in such a manner that as the intake manifold vacuum increases said spool slides in one direction and as the intake manifold vacuum decreases said spool slides in the opposite direction, a second main line connected to said vacuum valve in such a manner that when said spool slides in one direction the pressure in said second line decreases and when said spool slides in the opposite direction the pressure increases an amplifier valve having an axially slidable spool and connected to said second main line in such a manner that the pressure in said second main line exerts a force on said spool tending to slide it in one direction, said spool being operatively connected to said regulator valve spool in such a manner that when said amplifier valve spool slides in one direction said regulator valve spool slides also in said one direction, a third line connected to said second line through an orifice, said third main line being connected to said regulator valve in such a manner that the pressure in said third main line tends to cause the regulator valve spool to slide in said opposite direction, a nozzle connected to said third main line, said nozzle being operatively closed by means of said plunger of the second electronic actuator in response to said line pressure reduction signal, whereby when said solenoid coil is energized by said line pressure reduction signal, the pressure in said third main line increases so as to cause said regulator valve spool to slide in said opposite direction and reduce the pressure in said first main line.

* * * * *